(12) United States Patent
D'Halluin et al.

(10) Patent No.: US 11,210,212 B2
(45) Date of Patent: Dec. 28, 2021

(54) CONFLICT RESOLUTION AND GARBAGE COLLECTION IN DISTRIBUTED DATABASES

(71) Applicant: Western Digital Technologies, Inc., San Jose, CA (US)

(72) Inventors: Carl Rene D'Halluin, Zwijnaarde (BE); Bastiaan Stougie, Havant (BE); Koen De Keyser, Sint-Denijs-Westrem (BE); Thomas Demoor, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 117 days.

(21) Appl. No.: 16/016,551

(22) Filed: Jun. 23, 2018

(65) Prior Publication Data

US 2019/0057028 A1    Feb. 21, 2019

Related U.S. Application Data

(60) Provisional application No. 62/548,393, filed on Aug. 21, 2017.

(51) Int. Cl.
*G06F 12/02* (2006.01)
*G06F 16/27* (2019.01)

(52) U.S. Cl.
CPC .......... *G06F 12/0253* (2013.01); *G06F 16/27* (2019.01); *G06F 2212/1044* (2013.01)

(58) Field of Classification Search
CPC .................... G06F 12/0253; G06F 2212/1044
(Continued)

(56) References Cited

U.S. PATENT DOCUMENTS 5,280,612 A    1/1994    Lorie et al.
5,682,537 A    10/1997   Davies et al.
(Continued)

FOREIGN PATENT DOCUMENTS

CN    105740447 A    7/2016
IN    2015KO00101 A    12/2015
(Continued)

OTHER PUBLICATIONS

International Preliminary Report on Patentability, PCT/US2018/035921, dated Mar. 5, 2020 (8 pages).
(Continued)

*Primary Examiner* — Alford W Kindred
*Assistant Examiner* — Allen S Lin
(74) *Attorney, Agent, or Firm* — Patent Law Works LLP

(57) ABSTRACT

A novel distributed data storage system is disclosed. In an example method, a first plurality of key entries is stored in a first key data store at a first location and a second plurality of key entries is stored in a second key data at a second location. A key entry in comprises a corresponding key having an object identifier, an inverse timestamp, and a source identifier. The method further replicates a set of the first key entries to the second key data store. The method further inserts each first key entry from the set of the first key entries into the second key data store based on the object identifier, the inverse timestamp, and the source identifier of the first key included in that first key entry, the first key entries and the second key entries being interwoven to form a plurality of interwoven ordered key entries.

20 Claims, 8 Drawing Sheets

(58) Field of Classification Search
USPC .......................................................... 707/626
See application file for complete search history.

(56) References Cited

U.S. PATENT DOCUMENTS

| | | | |
|---|---|---|---|
| 5,806,074 | A | 9/1998 | Souder et al. |
| 5,937,414 | A | 8/1999 | Souder et al. |
| 5,974,425 | A | 10/1999 | Obermarck et al. |
| 6,434,575 | B1 | 8/2002 | Berry et al. |
| 6,496,830 | B1* | 12/2002 | Jenkins, Jr. ............. G06F 16/30 |
| 6,606,626 | B1 | 8/2003 | Ponnekanti |
| 7,962,458 | B2 | 6/2011 | Holenstein et al. |
| 9,043,280 | B1 | 5/2015 | Patwardhan |
| 9,165,002 | B1 | 10/2015 | Lazier |
| 9,171,044 | B2 | 10/2015 | Schleimer et al. |
| 9,223,877 | B1 | 12/2015 | Cao et al. |
| 9,317,576 | B2 | 4/2016 | Merriman et al. |
| 9,396,202 | B1 | 7/2016 | Drobychev et al. |
| 9,400,828 | B2 | 7/2016 | Kesselman et al. |
| 9,460,008 | B1 | 10/2016 | Leshinsky et al. |
| 10,409,692 | B1 | 9/2019 | Brenner et al. |
| 10,514,985 | B1 | 12/2019 | Patwardhan et al. |
| 2002/0116356 | A1 | 8/2002 | Ieong et al. |
| 2005/0223277 | A1 | 10/2005 | Ballard |
| 2009/0228443 | A1 | 9/2009 | Lapin et al. |
| 2010/0094813 | A1 | 4/2010 | Brueggemann et al. |
| 2011/0302143 | A1 | 12/2011 | Lomet |
| 2012/0254175 | A1 | 10/2012 | Horowitz et al. |
| 2013/0006993 | A1 | 1/2013 | Kobayashi |
| 2013/0024722 | A1 | 1/2013 | Kotagiri et al. |
| 2013/0073532 | A1 | 3/2013 | Bachar et al. |
| 2013/0117272 | A1 | 5/2013 | Barga et al. |
| 2013/0117654 | A1 | 5/2013 | Rosner |
| 2013/0166521 | A1 | 6/2013 | Ghatty et al. |
| 2013/0297697 | A1* | 11/2013 | Haimovitch ....... G06Q 30/0633 709/204 |
| 2013/0311422 | A1 | 11/2013 | Walker et al. |
| 2014/0006458 | A1 | 1/2014 | Hsieh et al. |
| 2014/0149353 | A1 | 5/2014 | Lee et al. |
| 2015/0067088 | A1* | 3/2015 | Guerin .................. G06F 15/167 709/213 |
| 2015/0081810 | A1 | 3/2015 | Christianto et al. |
| 2015/0130630 | A1 | 5/2015 | Outwater et al. |
| 2015/0172412 | A1 | 6/2015 | Escriva et al. |
| 2015/0213109 | A1* | 7/2015 | Kassko ................ G06F 40/205 707/603 |
| 2015/0317349 | A1 | 11/2015 | Chao et al. |
| 2016/0110109 | A1 | 4/2016 | Cowling et al. |
| 2016/0147811 | A1 | 5/2016 | Eluri et al. |
| 2016/0179850 | A1 | 6/2016 | Martin et al. |
| 2016/0210228 | A1 | 7/2016 | Tandel |
| 2017/0132429 | A1 | 5/2017 | Bell et al. |
| 2017/0185625 | A1* | 6/2017 | Cheru ................ G06F 16/1744 |
| 2017/0193031 | A1* | 7/2017 | Papapanagiotou ......................... G06F 11/1451 |
| 2017/0206231 | A1* | 7/2017 | Binder .................... G06T 15/06 |
| 2017/0220617 | A1 | 8/2017 | Bortnikov et al. |
| 2017/0371912 | A1 | 12/2017 | Kimura |
| 2018/0218022 | A1 | 8/2018 | Mace et al. |
| 2018/0225051 | A1* | 8/2018 | Vansa .................... G06F 3/0611 |
| 2018/0276223 | A1 | 9/2018 | Dhanasekaran et al. |
| 2019/0050429 | A1* | 2/2019 | Parayatham ............ G06N 20/00 |

FOREIGN PATENT DOCUMENTS

| | | |
|---|---|---|
| WO | 2013019888 A1 | 2/2013 |
| WO | 2014008495 A2 | 1/2014 |

OTHER PUBLICATIONS

Ho, Ricky, "Everything You Need to Know About Couchbase Architecture," Database Zone, Jul. 12, 2012, 23 pages.

Kaur et al., "Concurrency Control in Distributed Database System," International Journal of Advanced Research in Computer Science and Software Engineering, vol. 3, Issue 7, Jul. 2013 (5 pages).

Tracy, "Serializable, Lockless, Distributed: Isolation in CockroachDB," May 4, 2016 (10 pages).

Wei, X., et al., Fast In-Memory Transaction Processing Using RDMA and HTM, Shanghai Jiao Tong University Paper, Oct. 4-7, 2015, p. Monterey, CA.

Taherimonfared, A., et al., Real-Time Handling of Network monitoring Data Using a Data-Intensive Framework, Paper, 2013, p. 258-265, IEEE International Conference on Cloud Computing Technology and Science.

Gao, et al., Application Specific Data Replication for Edge Services, Paper, May 20-24, 2003, p. 1-16, Budapest, Hungaryb http://www2003.org/cdrom/papers/refereed/p669/www03_xhtml/lead.html.

Goel, S. et al., Data Replication Strategies In Wide Area Distributed Systems, Paper, 2006, p. 1-27, The University of Melbourne, Australia, http://www.cloudbus.org/papers/DataReplicationInDSChapter2006.pdf.

Katsov, I., Distributed Algorithms in NoSQL Databases, Highly Scalable Blog, Date Accessed Oct. 12, 2016, p. 1-18, https://highlyscalable.wordpress.com/2012/09/18/distributed-algorithms-in-nosql-databases/.

Dragojevic, A., et al., FaRM: Fast Remote Memory, Paper of the Proceedings of the 11th USENIX Symposium an Networked Systems Design and Implementation, Apr. 2-4, 2014, p. 400-414, Seattle, WA, https://www.usenix.org/conference/nsdi14/ technical-sessions/dragojevic.

Amazon Simple Storage Service Developer Guide, API Version, Mar. 1, 2006, p. 1-6, http://docs.aws.amazon.com/AmazonS3/latest/dev/mpuoverview.html.

Haapasalo, T., et al., Concurrent Updating Transactions on Versioned Data, Paper, Sep. 16-18, 2009, p. 77-87, Finland.

International Search Report and Written Opinion, PCT/US2018/035921, dated Aug. 27, 2018, p. 1-14.

Hoffer, Jeffrey A. et al, Modern Database Management, Advanced Database Topics, Part V, Chapter 12, "Distributed Databases," 2013, 28 pages <http://wps.pearsoned.co.uk/wps/media/objects/10977/11240737/Web%20chapters/Chapter%2012_WEB.pdf>.

Krzyzanowski, Paul et al., "Distributed Systems 20. Spanner," Nov. 21, 2016, 14 pages <https://www.cs.rutgers.edu/~pxk/417/notes/content/20-spanner-slides.pdf>.

Murat, "Spanner: Google's Globally-Distributed Database" Jul. 4, 2013, 5 pages <http://muratbuffalo.blogspot.in/2013/07/spanner-googles-globally-distributed_4.html>.

Rystsov, Denis, "Visualization of serializable cross shard client-side transactions," Mar. 2, 2016, 5 pages <http://rystsov.info/2016/03/02/cross-shard-txs.html>.

\* cited by examiner

CONFLICT RESOLUTION AND GARBAGE COLLECTION IN DISTRIBUTED DATABASES

TECHNICAL FIELD

The present disclosure generally relates to conflict resolution and garbage collection in distributed databases.

BACKGROUND

The rise in electronic and digital device technology has rapidly changed the way society communicates, interacts, and consumes goods and services. A variety of relatively inexpensive electronic devices are enabled by the advances in digital and electronic technology and can be used for a variety of purposes. Specifically, modern electronic devices, such as desktop computers, laptops, smart phones, and tablets, allow a user to have continuous access to a variety of useful applications. Using such applications results in the generation of an increasingly large amount of data. Storing and retrieving the produced data efficiently is a significant challenge.

Some solutions use a metadata database (DB) or key value stores (KVSs) in a large-scale decision support system (DSS) to provide scalability in an attempt to accommodate the current growth in data. These types of distributed, large-scale DSSs generally require that high levels of consistency be maintained in the metadata DB or KVS with a minimal impact on responsiveness.

In order to provide enhanced protection against data loss and improve performance to clients spread over a wide geographic area, a key value store may be duplicated over different storage databases located in different geographic locations. In such systems, there is a need to efficiently synchronize the distributed databases and to resolve conflicts resulting from the asynchronous operation of the different databases in the system in an efficient and consistent way.

Furthermore, when synchronizing the distributed databases there is a need to perform garbage collection in the various databases while maintaining consistency.

SUMMARY

The present disclosure generally relates to a novel conflict resolution and garbage collection system.

According to one innovative aspect, a computer-implemented method comprises storing a plurality of first key entries in a first key data store located at a first location. Each first key entry of the plurality of first key entries comprises a corresponding first key having an object identifier, an inverse timestamp, and a source identifier identifying a requester of an associated storage operation represented by that first key entry. The method further comprises storing a plurality of second key entries in a second key data store located at a second location. Each second key entry of the plurality of second key entries comprises a corresponding second key having an object identifier, an inverse timestamp, and a source identifier identifying a requester of an associated storage operation represented by that second key entry. The method further comprises replicating a set of the first key entries from the first key data store to the second key data store and inserting each first key entry from the set of the first key entries into the second key data store based on the object identifier, the inverse timestamp, and the source identifier of the first key included in that first key entry. The set of the first key entries are interwoven with the plurality of second key entries upon insertion to form a plurality of interwoven ordered key entries.

Other aspects include corresponding methods, systems, apparatus, and computer program products for these and other innovative aspects. For example, one aspect may include a distributed data storage system comprising one or more processors, a first key data store at a first location, a second key data store at a second location, a synchronization application executable by the one or more processors. The first key data store comprises a plurality of first key entries. Each first key entry of the plurality of first key entries comprises a corresponding first key having an object identifier, an inverse timestamp, and a source identifier identifying a requester of an associated storage operation represented by that first key entry. The second key data store at a second location comprising a plurality of second key entries. Each second key entry of the plurality of second key entries comprises a corresponding second key having an object identifier, an inverse timestamp, and a source identifier identifying a requester of an associated storage operation represented by that second key entry. The synchronization application performs operations comprising replicating a set of the first key entries from the first key data store to the second key data store, and inserting each first key entry from the set of the first key entries into the second key data store based on the object identifier, the inverse timestamp, and the source identifier of the first key included in that first key entry, the set of the first key entries being interwoven with the plurality of second key entries upon insertion to form a plurality of interwoven ordered key entries.

In another example, a system comprises means for storing a plurality of first key entries in a first key data store located at a first location, means for storing a plurality of second key entries in a second key data store located at a second location, and means for replicating a set of the first key entries from the first key data store to the second key data store. Each first key entry of the plurality of first key entries comprises a corresponding first key having an object identifier, an inverse timestamp, and a source identifier identifying a requester of an associated storage operation represented by that first key entry. Each second key entry of the plurality of second key entries comprises a corresponding second key having an object identifier, an inverse timestamp, and a source identifier identifying a requester of an associated storage operation represented by that second key entry. The system further comprises means for inserting each first key entry from the set of the first key entries into the second key data store based on the object identifier, the inverse timestamp, and the source identifier of the first key included in that first key entry, the set of the first key entries being interwoven with the plurality of second key entries upon insertion to form a plurality of interwoven ordered key entries.

These and other implementations may optionally include one or more of the following features: that inserting a particular first key entry from the set of the first key entries into the second key data store comprises determining that the object identifier and the inverse timestamp of the corresponding first key included in the particular first key entry respectively match the object identifier and the inverse timestamp associated with the corresponding second key included in a particular second key entry in the plurality of second key entries; and determining a position of the particular first key entry with respect to the particular second key entry in the second key data store based on the source identifier of the corresponding first key included in the particular first key entry and the source identifier of the corresponding second key included in the particular second key entry; the position of the particular first key entry is one of immediately after the particular second key entry in the second key data store and immediately before the particular second key entry in the second key data store; that replicating the set of the first key entries from the first key data store to the second key data store is executed responsive to receiving a request to synchronize the first key data store with the second key data store; that in each corresponding first key, the source identifier is appended as a suffix to the inverse timestamp; that in each corresponding second key, the source identifier is appended as a suffix to the inverse timestamp; that a relative order of the plurality of second key entries is maintained after insertion of the set of the first key entries into the second key data store; that the plurality of interwoven ordered key entries is ordered alphanumerically using object identifiers, inverse timestamps, and source identifiers from corresponding keys of the plurality of interwoven ordered key entries; determining to garbage collect a particular interwoven key entry in the plurality of interwoven ordered key entries based on the object identifier, the inverse timestamp, and the source identifier of a corresponding key of the particular interwoven key entry; determining that a particular interwoven key entry in the plurality of interwoven ordered key entries is a most-recent key entry for a particular object identifier based on a corresponding key of the particular interwoven key entry; retaining the particular interwoven key entry; determining that a particular interwoven key entry in the plurality of interwoven ordered key entries is not a most-recent key entry for a particular object identifier based on a corresponding key of the particular interwoven key entry; determining that a source identifier in the corresponding key of the particular interwoven key entry matches the source identifier of the corresponding key of a most-recent key entry associated with the particular object identifier in the plurality of interwoven ordered key entries; garbage collecting the particular interwoven key entry; determining that a particular interwoven key entry from the plurality of interwoven ordered key entries is not a most-recent key entry for a particular object identifier based on a corresponding key of the particular interwoven key entry; determining that a source identifier in the corresponding key of the particular interwoven key entry does not match a source identifier of the corresponding key of a most-recent key entry associated with the particular object identifier in the plurality of interwoven ordered key entries; determining that the particular interwoven key entry is the first key entry in the plurality of interwoven ordered key entries with the source identifier that does not match the source identifier of the corresponding key of the most-recent key entry associated with the particular object identifier; and selecting a resolution action based on a difference between a first inverse timestamp associated with the most-recent key entry and a second inverse timestamp associated with the particular interwoven key entry.

Other aspects include corresponding methods, systems, apparatus, and computer program products for these and other innovative aspects.

It should be understood that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes novel conflict resolution technology for distributed databases (e.g., databases that store a key-value store (KVS) at different geographical locations, and so on), which may include methods, systems, apparatuses, computer program products, and other aspects, that are more efficient than the approaches described in the Background. The technology is advantageously scalable and can be implemented without requiring multi-key transactions to guarantee consistency.

As a non-limiting overview, the technology includes a key ticketing system that can store keys in a plurality of key data stores in a distributed database in a novel, ordered way that improves responsiveness and data retention when processing storage operations (e.g., read and write requests and so on). Each key data store supports a plurality of storage operations, such as but not limited to, put, get, delete, list, and so on, and stores entries representing various data manipulation operations performed on objects, such as standard data manipulation operations (e.g., read, write, delete, modify, etc.).

As each key data store receives data operation requests, the set of key entries at a particular data store may include key entries not yet stored in the central key data store. In response, the key data stores stored at branch locations are periodically or asynchronously synchronized with the central database location. The novel ordering used by the distributed database system enables sets of key entries to be synchronized efficiently and consistently at each key data store.

Figure 1A:
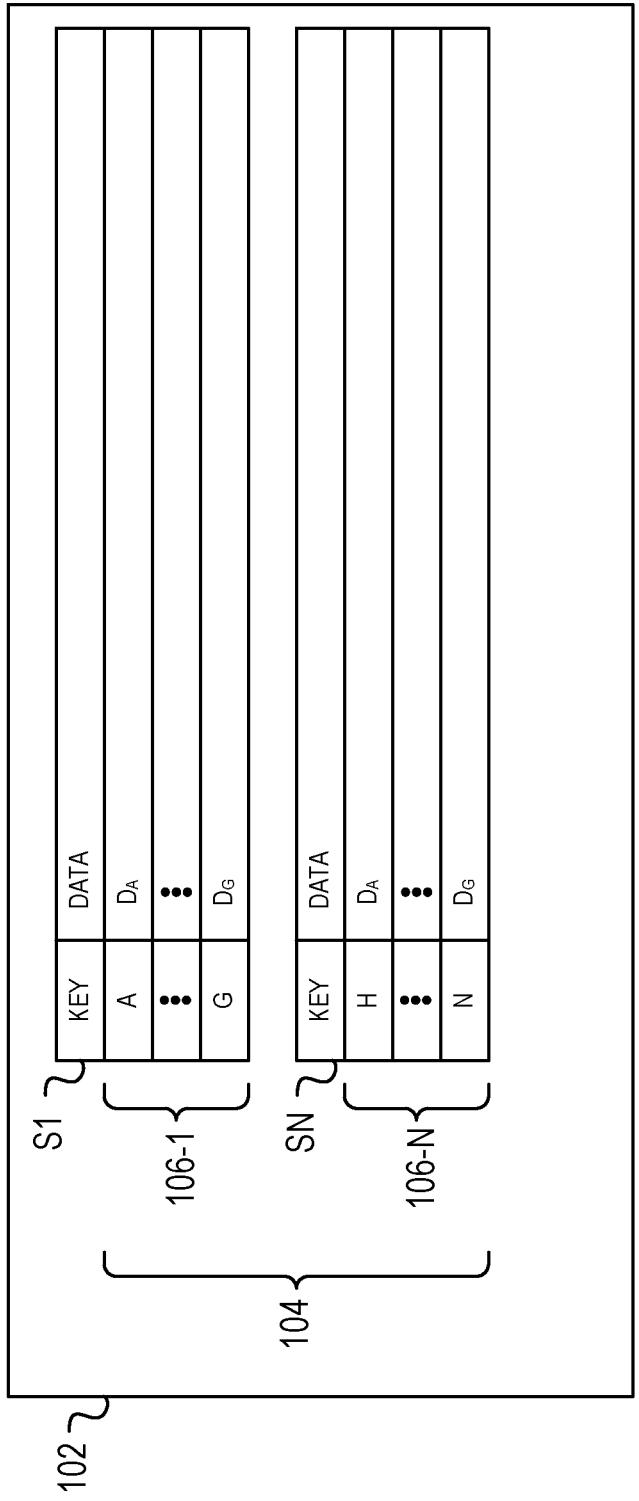
FIG. 1A is a diagram illustrating an example key data store.

FIG. 1A is a diagram illustrating an example key data store 102, which comprises a plurality of shards from S1 to SN. While two shards (S1 and SN) are shown, it should be understood that any suitable number of shards may be included. Each shard stores an ordered subset of key entries. For example, shard S1 is shown as storing the subset of key entries 106-1 (e.g., keys A-G) and shard SN is shown as storing the subset of key entries 106-N (e.g., keys H-N). The key entries 106-1 through 106-N comprise the ordered set of key entries 104.

Further, as shown in FIG. 1A, each key (e.g., A . . . N, etc.) can correspond to a data instance (e.g., DA . . . DN). The data instance may comprise a pointer to a location where the actual object data is stored (e.g., in a separate database, on a physical drive, etc.), or other suitable data values. Each key corresponds to a particular object. Further, various subsets of key entries may correspond to the same object at different points in time. In such a configuration, an ordered set of key entries can be stored across shards that can be efficiently searched. Further, storage of the actual data may be performed in accordance with various considerations such as data location, availability, and cost.

Figure 1B:
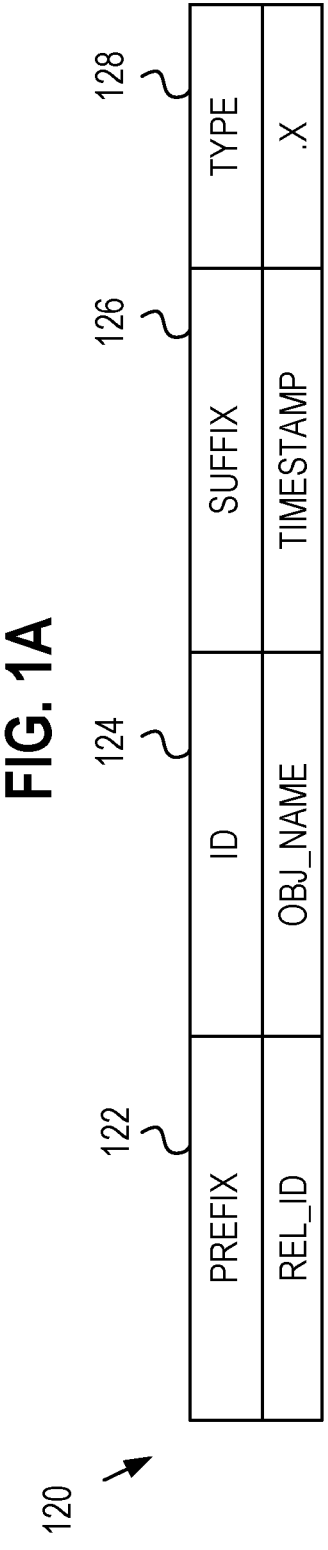
FIG. 1B is a diagram of an example key entry naming structure.

A key (also referred to as an object key) may be generated using a key naming structure. FIG. 1B is a diagram of an example key naming structure 120. As shown, a key may comprise a combination of a plurality of key components, such as, but not limited to, an object identifier and an inverse time value. More particularly, as shown, example components include a prefix 122, an object identifier 124, a suffix 126, and an operation type 128, although it should be understood that other dimensions are possible and contemplated, and could vary based on implementation.

The prefix 122 may comprise an identifier for identifying a group of key entries from the ordered set of key entries that are logically related. For example, the prefix may include a domain identifier, a bucket identifier, a client identifier, or any suitable combination thereof. In this way, a given client's object keys may be grouped together. Any suitable number of prefixes may be included in a key.

The object identifier 124 may comprise a unique identifier for the object to which the key corresponds, such as an object name An example object identifier may comprise a unique character string (e.g., a file identifier, a file name, etc.) that is auto-generated and/or user-defined, and used for storing the object or file in an object storage, although other suitable data constructs that can uniquely identify objects are also encompassed.

The suffix 126 may comprise a ticket value for ordering different object keys associated with a particular object. The ticket value (also simply called ticket in some embodiments) may be an inverse timestamp. As discussed further herein, an inverse timestamp is calculated by determining the difference between an operation timestamp associated with the object key (e.g., local timestamp) and a reference timestamp value. As time passes, the value of the inverse timestamp generally decreases. As such, two sequential operations associated with the same object are recorded in the key data store in inverse order, with the more recent operation being represented first (ahead of the less recent operation).

The timestamp may reflect a local timestamp of the computing system involved with performing a storage-related operation (e.g., a client or server system that triggered the operation (e.g., responsive to a user input modifying an object, an automated procedure or program that modified the object, etc.), the server system implementing the operation (e.g., such as the server system hosting the storage application 224), etc. The reference timestamp may reflect a reference time value used to calculate the inverse timestamp, as described elsewhere herein. In some embodiments, the reference timestamp may be predetermined, stored in memory, and retrieved by the key data store controller 324 to perform the calculation. By way of further example, the inverse timestamp may be computed by subtracting the operation timestamp from the reference timestamp. For example, if the reference timestamp is 100 milliseconds and the operation timestamp is 65 milliseconds, the inverse timestamp would be equal to 100−65=35.

In some embodiments, when generating the object key, the key data store controller 324 can append the inverse timestamp to the object identifier as a suffix. For instance, an example object identifier may be Object1 and an example inverse timestamp may be 30, in which case at least a portion of the object key comprises a value combining Object1 and 30 (e.g., Object130, Object1_30, Object1.30, etc. In some cases, a delimiter may be used to separate the constituent components of the object key. The delimiter may comprise any suitable symbol or sequence of symbols. For example, the delimiter may comprise a period, in which case the foregoing example object key would be Object1.30. Continuing this example, a subsequent operation is performed on the object where the inverse timestamp is computed to be 20. In this case, the object key comprises Object1.20 as at least a part of its name, and when inserted into the key data store 230, would be positioned ahead of Object1.30 because of the difference between the inverse timestamp components (e.g., 20<30).

Additional suffix(es) may be appended, such as, but not limited to, an operation type, such as operation type 128 or a source identifier. The operation type 128 may comprise an identifier of the type of object storage operation that is represented by the key entry. In some embodiments, a given operation may be denoted by a corresponding value, such as, but not limited to, a unique character or character string, and the operation type 128 may include that value. Example object storage operations include read, write, delete, update, and so on. As a further example, write and update operations may be represented by a given identifier (e.g., "W"), a delete operation may be represented a given identifier (e.g., "K), and so forth. While in some example embodiments, write and update operations may be recorded as the same type of operation, in further embodiments, they may be differentiated. The sequence of the suffixes and prefixes can vary depending on further grouping and sorting needs in some cases, and may be delimited, as described elsewhere herein.

In some example embodiments, a source identifier may comprise an identifier of a particular key data store or storage location in a distributed database system. In some embodiments, a given key data store or database location may be denoted by a corresponding value, such as, but not limited to, unique character or character string, and the source identifier may include that value. This source identifier may allow potential conflicts to be resolved for key entries received at different branch locations for the same object at the same time.

Figure 1C:
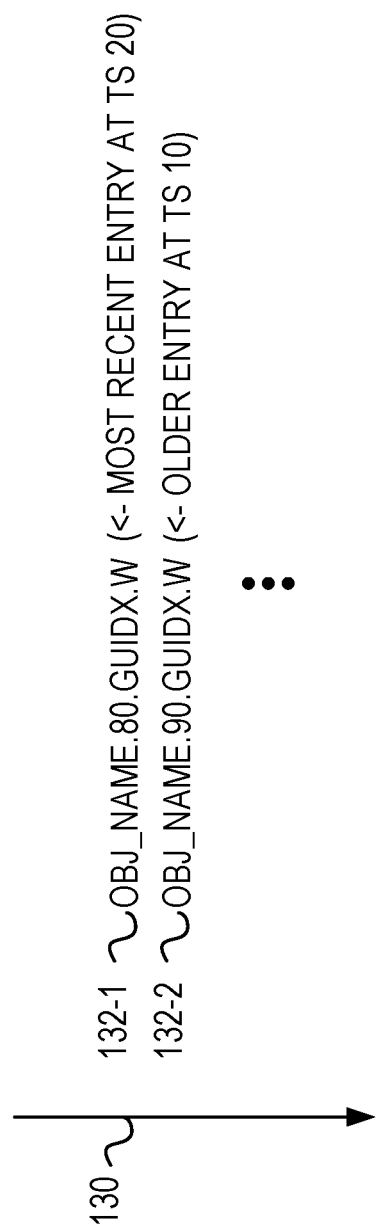
FIG. 1C is a diagram showing an example ordered set of key entries.

FIG. 1C is a diagram showing an example ordered set of key entries 130. As shown, the ordered set of key entries 130 includes two key entries 132-1 and 132-2 representing two sequential write operations. In this example, key entry 132-1 includes an operation timestamp of 20 milliseconds, the key entry 132-2 includes an operation timestamp of 10 milliseconds, and the ticketing technology uses an example reference timestamp of 100 milliseconds. It should be understood that the timestamp values used are provided by way of example to make the examples provided herein clear, and any suitable timestamps may apply, such as a portable operation system interface (POSIX) timestamp, a 1900 date system timestamp, derivations there, and/or any other suitable convention for tracking time. Further, as a matter-of-course, the value of the reference timestamp is often chosen to have a value that is larger than the expected service life of the key data store.

Using the reference timestamp, the ticketing technology determines an inverse timestamp for each of the operations. As the operation timestamps increase with the passage of time, the computed inverse timestamps for executed operations correspondingly decrease. For instance, an inverse timestamp for a given operation is calculated by determining the difference between the operation timestamp and the reference timestamp. In particular, continuing the above example, for key 132-1, the inverse timestamp is 80 (100−20=80), and for key 132-2, the inverse timestamp is 90 (100−10=90).

By ordering the entries in the key data store (and the operations represented thereby) relating to the same data object using at least the inverse timestamps, subsequent operations relating to that data object are arranged in key entries in the ordered key data store with the most-recent operation being represented first. For instance, as shown in FIG. 1C, key entry 132-2, which represents an operation having an inverse timestamp of 90, is less recent than key entry 132-1, which represents a more recent operation having a timestamp of 80. As a result, a key entry comprising key entry 132-1 is ordered ahead of a key entry comprising key entry 132-2 in the ordered set of key entries 130 because key entry 132-1's inverse timestamp is lower (80 versus 90).

By way of further example, during a subsequent query, retrieval of the most-recent key entry from the ordered set of key entries (e.g., in this example, the key entry comprising key entry 132-1) can be performed efficiently (e.g., by the key data storage controller 324, see FIG. 3) because retrieval of the first entry in the ordered set for a given object (e.g., OBJ_NAME) does not require iteration through key entries associated with that object. Rather, by way of illustration, such a retrieval may consume equivalent computational resources as that of an exact lookup of a single key entry for that object.

Versioning of an object includes the tracking and preservation of more than one version of the object as the object changes over time, and allows for the archival of the different versions of the object as they occur over time (e.g., due to modifications made over time to the object), retrieval of a prior version of the object, and/or recovery from unintended overwrites and/or deletions made to the object.

Advantageously, using the inverse timestamps as suffixes allows versioning of an object to be achieved in a scalable way without impacting performance of single key read operations, and/or without impacting the design or configurations of the key data store and/or its shards.

The ticketing technology can also provide for lock-free concurrency. As discussed further below, the ticketing technology may do so by including a suffix in the key entry that identifies the particular client making the object storage request. The key entry's client identifier advantageously allows the ticketing technology to handle concurrent object storage requests of different clients, which are issued at exactly the same time, without having to revert to performance-reducing lock mechanisms.

Figure 2:
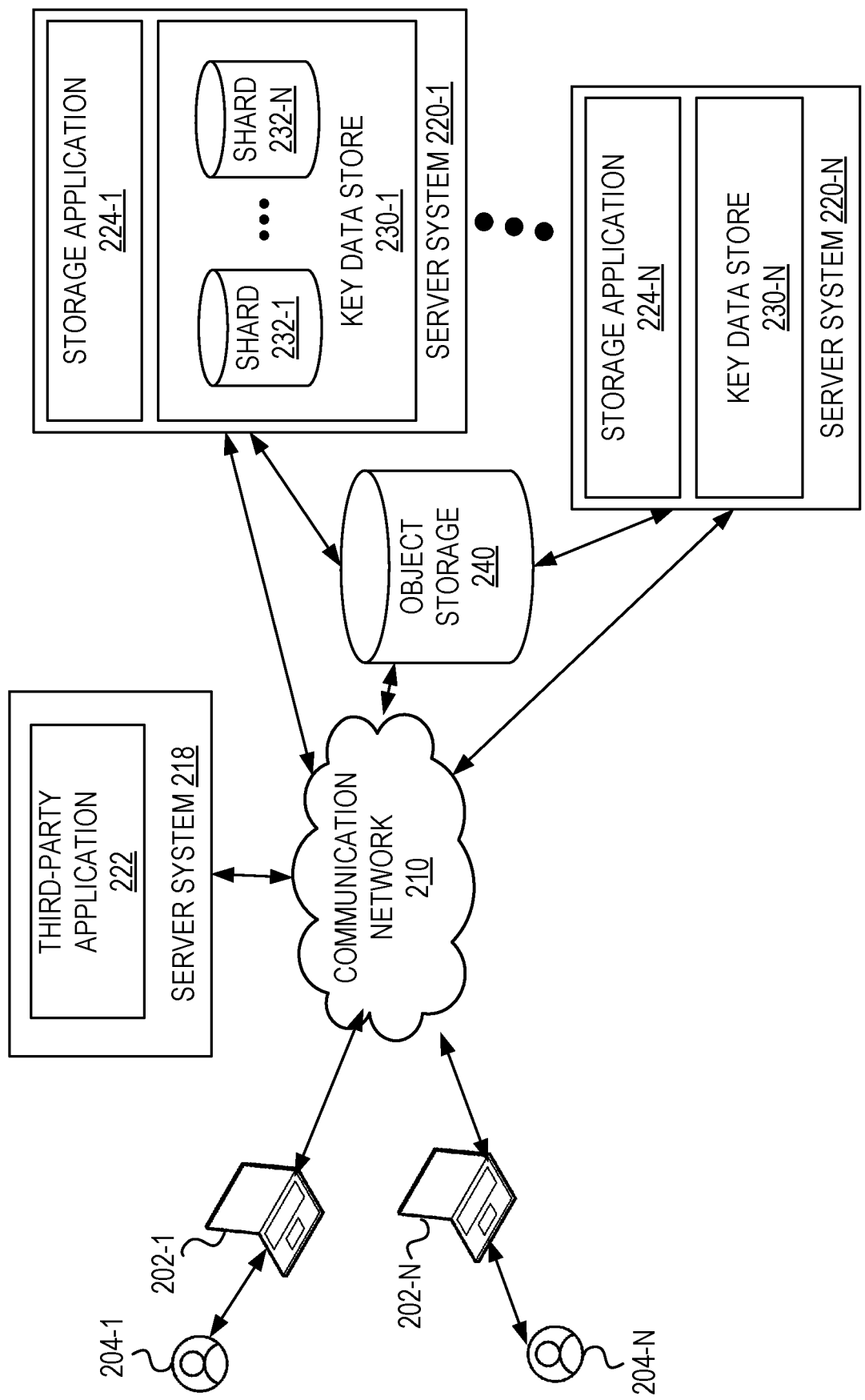
FIG. 2 is a block diagram of an example distributed data storage system.

The key data store may be implemented in a distributed environment, such as the distributed data storage system 200 depicted in FIG. 2. As shown, the distributed data storage system 200 can include client systems (e.g., client systems 202-1 and 202-N), server systems (e.g., server system 218, server systems 220-1 ... 220-N, etc.), and one or more object storages 240. These components (e.g., 202, 218, 220, 230, and/or 240) may be interconnected via a communication network 210. For simplicity in some cases, depending on context, the client systems 202-1 ... 202-N may also be referred to herein individually or collectively as client system 202, and the server systems 220-1 ... 220-N may be referred to herein individually or collectively as server system 220.

The communication network 210 may include any number of private and public computer networks. The communication network 210 include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via the communication network 210 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols.

A client system may comprise an electronic computing device, such as a personal computer (PC), a laptop, a smartphone, a tablet, a mobile phone, a wearable electronic device, server, server appliance, or any other electronic device or computing system capable of communication with the communication network 210. The client system 202 may store one or more client applications in non-transitory memory. A client application may be executable by a computer processor of the client system 202. In some example embodiments, a client application includes one or more applications such as, but not limited to, data storage applications, search applications, communication applications, productivity applications, game applications, word processing applications, or any other useful applications. A client application may include a web browser and/or code executable thereby in some cases. In some embodiments, a client system 202 may include an application for creating, modifying, and deleting objects, which may be stored in the object storage 240. For instance, the application may be specifically customized for communication with the third-party application(s) 222 and/or storage application 224, such as an application adapted to configure and/or utilize programming interfaces of the storage application 224. In some embodiments, the third-party application(s) 222 hosted by the server system 218 may embody a client of the storage application 224, as it may access the functions of the storage application 224 using various programmatic interfaces surfaced thereby (e.g., to create, store, retrieve, delete, etc., objects stored in the object storage).

The client systems 202 and/or server systems 218 and/or 220 may send/receive requests and/or send/receive responses, such as but not limited to HTTP(S) requests/responses, to/from one another. A client system 202 may present information, such as visual, audio, tactile, and/or other information via output devices, such as displays, audio reproduction devices, vibration mechanism, and so on, based on information generated by client system 202 and/or received from a server system 218 or 220.

Users may interact with various client systems 202 to provide input and receive information. For instance, as illustrated, users 204-1 and 204-N may interact with client systems 202-1 and 202-N by utilizing the operating system and/or various applications executing on the client systems 202-1 and 202-N.

In some embodiments, a client application (e.g., a client application executing on a client system 202, the third-party application(s) 222, etc.) may send a request (also referred to as an object storage request) to the server system 220 to store, update, delete, or retrieve a particular file stored in the object storage 240 through the communication network 210. For example, a user 204 may update a document using a word processing application and may save the updated version to the server system 220-N, in which case the word processing application transmits a request to the storage application 224 to store the updates.

The object storage request may include information describing the object being updated, such as a file name, the data comprising the updates, a client identifier, an operation type, etc., and the storage application 224 may use that information to record the updates, as described herein. In another example, a client application (e.g., an application executing on a client system 202, the third-party application 222, etc.) may request an object or portion thereof, a list of objects matching certain criteria, etc., in which case the request may include corresponding information (e.g., an object identifier, search criteria (e.g., time/date, keywords, and so on)), and receive an object list or the object itself from the storage application 224. Numerous other use cases are also applicable and contemplated.

As shown in FIG. 2, the server systems 220-1 . . . 220-N may respectively include instances of a storage application 224-1 . . . 224-N, and may be respectively coupled to and/or include instances of a key data stores 230-1 . . . 230-N. In some embodiments, a first instance of the server system 220, such as 220-1, may comprise a central database and a second instance of the server system 220, such as 220-N, may comprise a site (e.g., branch) database, as discussed in further detail herein.

For simplicity in some cases, depending on context, the instances of a storage application 224-1 . . . 224-N may also be referred to herein individually or collectively as storage application 224, and the instances of the key data stores 230-1 . . . 230-N may be referred to herein individually or collectively as a key data store 230.

The storage application 224 may include components that perform various tasks, as discussed with reference to at least FIG. 3. The storage applications 224, and/or its components, may be coupled for communication to one another and other components of the system, such as the key data store 230, the object storage 240, an application executing on a client system 202, the third-party application 222, etc.

The storage application 224 may provide an object storage service, manage data storage using the key data store 230 and the object storage 240 (e.g., store, retrieve, and/or other manipulate data in the key data store 230, retrieve data objects from the object storage 240, etc.), process requests received from various entities (e.g., client systems 202, server systems 220, local application, etc.), provide for lock-free concurrency, perform garbage collection, and perform other acts, as discussed further herein. The storage application 224 may include various interfaces, such software and/or hardware interfaces (e.g., application programming interface(s) (API(s)), that may be accessed (e.g., locally, remotely, etc.) by components of the distributed data storage system 200, such as various client applications, the third-party application 222, etc.

In some embodiments, the storage application 224 may be a distributed application that is implemented in two or more computing systems. In some embodiments, the object storage 240 may comprise a plurality of storage devices, servers, software applications, and other components, such as but not limited to any suitable enterprise data grade storage hardware and software. Similarly, while FIG. 2 shows the key data store 230 as residing on a single server, it should be understood that the key data store 230 may be distributed across two or more computing systems, such as server systems 220. In some embodiments, the storage application 224 may be a local application receiving local and/or remote storage requests from other clients (e.g., local applications, remote applications, etc.).

An instance of the key data store 230 may comprise a database that stores an ordered set of key entries, as discussed in further detail elsewhere herein. In some embodiments, the key data store 230 may comprise a horizontally partitioned database having two or more shards 232-1 to 232-N, although other suitable database configurations are also possible and contemplated. As horizontal partitioning is a database design principle whereby rows of a database table are held separately, rather than being split into columns (which is what normalization and vertical partitioning do, to differing extents), each partition may form part of a shard, which may in turn be located on a separate database server or physical location. Thus, depending on the configuration, database shards may be implemented on different physical storage devices, as virtual partitions on the same physical storage device, or as any combination thereof. As noted above, the key data store 230 may comprise a plurality of duplicate copies of the ordered set of ordered key entries at a plurality of database locations.

The server system 220-N may be coupled to and/or include an object storage 240. The object storage 240 comprises one or more data stores for storing data objects. The object storage 240 may implemented across a plurality of physical storage devices. In some example embodiments, the plurality of physical storage devices may be located at disparate locations. Objects stored in the object storage 240 may be referenced by key entries stored in the key data store 230. In some example embodiments, multiple copies of a given object or portions thereof (e.g., erasure-encoded copies) can be stored at different physical storage devices to protect against data loss through system failure or to have the object quickly accessible from different geographic locations.

The key data store 230 and/or the object storage 240 may be included in the server system 220-N or in another computing system and/or storage system distinct from but coupled to or accessible by the server system 220-N. The key data store 230 and/or the object storage 240 include one or more non-transitory computer-readable mediums (e.g., such as those discussed with reference to the memor(ies) 304 in FIG. 3) for storing the data. In some implementations, the key data store 230 and/or the object storage 240 may be incorporated with the memor(ies) 304 or may be distinct therefrom. In some implementations, key data store 230 and/or the object storage 240 may store data associated with a database management system (DBMS), such as one comprised by and/or controlled by the storage application 224 (e.g., the key data storage controller 324, the storage service 322, etc., see FIG. 3) and/or other components of the distributed data storage system 200. In some instances, the DBMS may store data in multi-dimensional tables comprised of rows and columns, and manipulate, e.g., insert, query, update and/or delete, rows of data using programmatic operations, although other suitable DBMS configurations are also applicable.

It should be understood that the distributed data storage system 200 illustrated in FIG. 2 is representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the distributed data storage system 200 may be integrated into a single computing device or system or additional computing devices or systems, etc.

Figure 3:
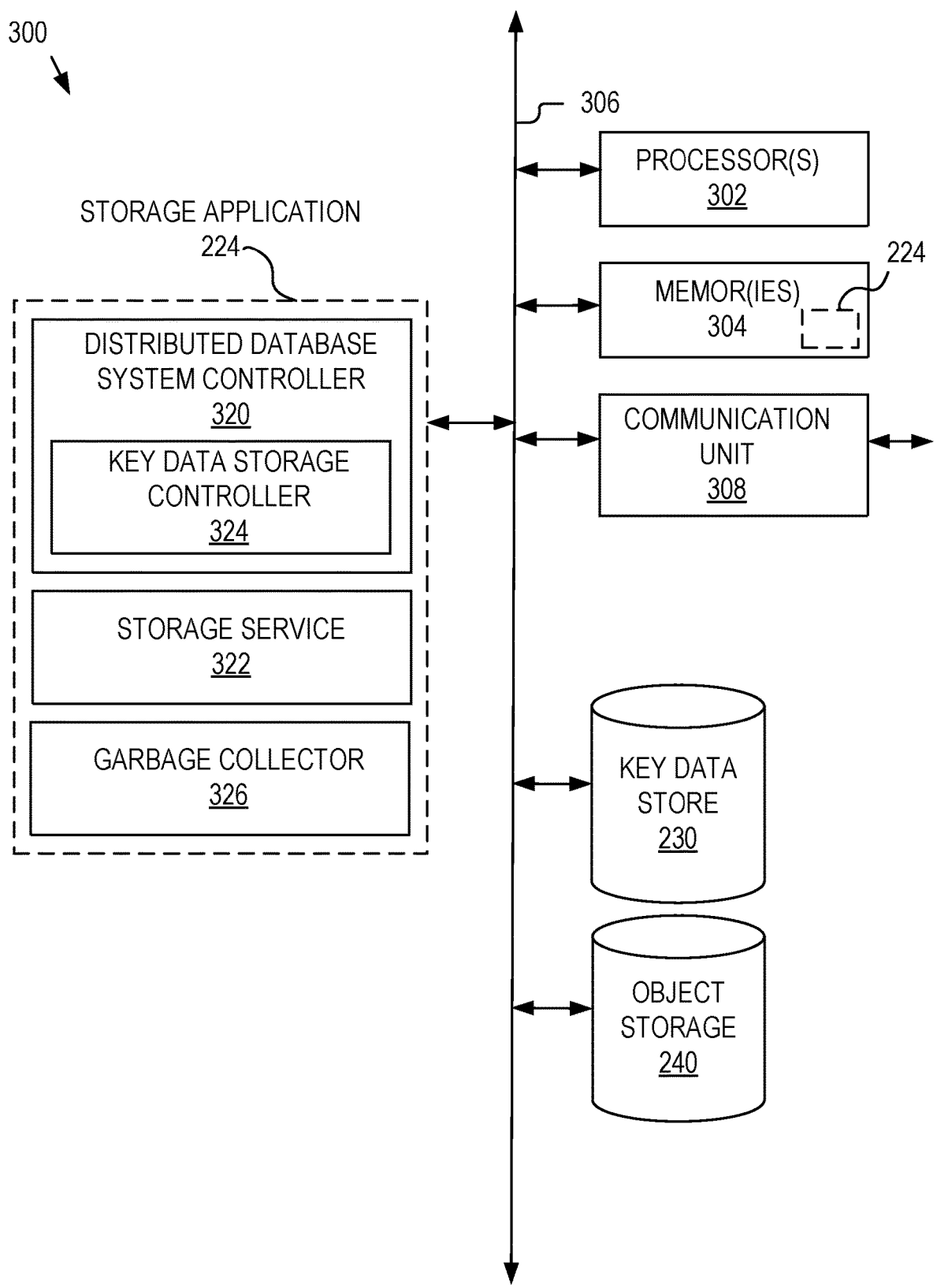
FIG. 3 is a block diagram of an example computing system.

FIG. 3 is a block diagram of an example computing system 300. In some embodiments, the computing system 300 may represent a server instance or collection of instances, such as the server system 220-N. In some embodiments, the computing system 300 may reflect other computing systems, such as a client system 202, a dedicated storage system, etc. The computing system 300 may comprise and/or be coupled to one or more processor(s) 302, one or more memor(ies) 304, one or more communication units 308, a key data store 230, and an object storage 240. The computing system 300 further includes an instance of the storage application 224. The components of the computing system 300 can be communicatively coupled by a communication bus 306. In some embodiments, the key data store 230 and/or the object storage 240 may be implemented in a separate computing system and may be coupled to the computing system 300 via the one or more communication units 308. In such embodiments, the storage application 224, or aspects thereof, may be implemented in the separate computing system (e.g., as a distributed or local application, etc.)

As shown in FIG. 3, the storage application 224 includes a distributed database system controller 320 and storage service 322, although it should be understood that the depicted storage application 224 architecture is provided by way of illustration, and that the storage application 224 may include other components and/or include other component hierarchies, and/or that the foregoing components and/or their acts and/or functionality may be combined or segmented into further components, etc.

The storage application 224, and/or its sub-components, such as, but not limited to, the distributed database system controller 320 and/or the storage service 322 may be implemented in hardware and/or software. For instance, the storage application 224, and/or one or more of its sub-components, may include hardware and/or software logic executable by the computing system 300. In some embodiments, the storage application 224, and/or one or more of its sub-components, may comprise sets of instructions executable by the processor(s) 302 to provide their functionality. In some embodiments, the storage application 224, and/or one or more of its sub-components, are stored in the memor(ies) 304 of the computing system 300 and are accessible and executable by the processor(s) 302 to provide their functionality. In any of the foregoing implementations, the storage application 224, and/or one or more of its sub-components, may be adapted for cooperation and communication with the processor(s) 302 and other components of the computing system 300.

In further implementations, the storage application 224, and/or one or more of its sub-components, may include specially configured software stored in the memor(ies) 304 and executable by the processor(s) 302 to configure the processor(s) 302. In some embodiments, the storage application 224, and/or one or more of its sub-components, may include logic gates, switches, application specific integrated circuitry (ASIC), a programmable logic controller, an embedded microcontroller, and/or other suitable hardware, etc. In further embodiments, the storage application 224, and/or one or more of its sub-components, may include both hardware and software aspects. Numerous further variations are also possible and contemplated.

It should be appreciated that computing system 300 may represent a single computing system, a plurality of computing systems connected over a wide geographic area, a server cluster, or other suitable computing configurations. Thus, while the structure, acts, and functionality of computing system 300 may be described in the singular for clarity, it should be understood that the description is applicable to and includes more simple or complex computing infrastructure.

The distributed database system controller 320 comprises logic executable to manage a system of distributed databases including one or more key data stores 230 at different database locations. For instance, the distributed database system controller 320 enables key data at stores at different distributed databases to remain synchronized and have a consistent order throughout all the distributed databases. In some example embodiments, the distributed database system controller 320 includes a key data storage controller 324 and a garbage collector 326.

The key data storage controller maintains the integrity of the ordered set of key entries, generates new key entries, stores new key entries, retrieves existing key entries, and manages conflicts, and so on, at the different key data stores.

In some embodiments, the key data storage controller 324 can maintain the key entries stored in the key data store 230 as an ordered set of key entries. As discussed elsewhere herein, such as with reference to FIGS. 1A-1C, the ordered set of key entries may first group the entries using at least an object identifier component of the key, and then group the key entries corresponding to each name in order of most-recent to least recent using an inverse time component of each of the keys. Additionally, key entries may further be grouped in the ordered set of key entries using further key components, such as one or more additional prefixes preceding the object name/identifier. One or more suffixes following the inverse timestamp component may be used to determine characteristics about the operation represented by the entry and/or further distinguish the key from other keys, for instance based on the application or device that executed the operation (e.g., client ID), the type of operation that was performed, the source identifier, and so forth.

In some example embodiments, key entries may comprise alphanumeric character strings that include letters, numbers, and/or symbols (character symbols, punctuation, mathematical symbols, etc.), in which case the ordered set of key entries may be sorted alphanumerically. For instance, referring to FIG. 1C, key entry 132-1 is first because the inverse timestamp of 80 comprising a portion of the character string of that key is lower than the inverse timestamp of 90 comprising a portion of the character string of the subsequent key entry 132-2. Also, note that configurations that reverse the sorting order and the inverse timestamps to achieve an objective equivalent to that as the ordered set of key entries are encompassed hereby. Further, the keys may comprise other suitable constructs (e.g., encoded, compressed, etc.) that can be sorted in an analogous manner The key data storage controller 324 stores key entries in the key data store 230 reflecting data manipulation operations performed on objects (e.g., read, modify, write, etc.). Entries may be stored responsive to object storage requests received by the storage service 322, such as but not limited to, put, get, delete, list, etc. The storage service 322 may be coupled to the distributed database system controller 320 to instruct the key data storage controller 324 to record the data manipulation operations. For example, and not limitation, in a software embodiment, the storage service 322 can call corresponding methods of the key data storage controller 324 configured to perform the various functions and acts described herein. An instruction received form the storage service 322 may comprise a new key entry request that includes components for generating the key entry, and in some embodiments, data corresponding to the key entry.

By way of example, when recording a write, update, delete, etc., operation, the key entry request received from the storage service 322 may include key-related data for generating the key, and a corresponding data instance (e.g., data value) for storage in association with the key. Responsive to receiving the storage instruction from the storage service 322, the key data storage controller 324 computes an inverse timestamp using the key-related data, generates the key using the inverse timestamp, the object identifier, etc. (e.g., a prefix, an operation type, etc.), and stores a new entry comprising the generated key and the data instance in order of temporal proximity, as described elsewhere herein.

Continuing the foregoing example, the key data storage controller 324 can determine the inverse timestamp using an operation timestamp and a reference timestamp by determining a difference between the operation timestamp and the reference timestamp (e.g., subtracting the operation timestamp from the reference timestamp), as discussed elsewhere herein. The operation timestamp may be included in the instruction data or may be determined by the key data storage controller 324 (e.g., using a clock of the local system, issuing a call to the operating system, etc.). For instance, the object storage request received and processed by the storage service 322 includes a timestamp determined by the requesting computing system upon which the request was initiated (e.g., a client system 202, server system 220-1, etc.). In this case, the local operation timestamp may reflect the point in time in which the object storage operation was initiated (e.g., based on a clock of that system). In another example, the key data storage controller 324 assigns a timestamp to a requested object storage request based on the clock at the server system 220. Other suitable variations may also apply.

In the foregoing example, the new entry is situated first for that object (relative to other existing entries) in the ordered set of key entries since it is the most recent based on the inverse timestamp. As further operations are performed on the object, as discussed elsewhere herein, corresponding further entries are added to a key data store 230 and the foregoing new entry becomes less recent. This advantageously allows for scalable and flexible versioning of a data object.

An operation type component included in the key generated by the key data storage controller 324 may reflect the operation performed on the object, and may be used to record the lifecycle of the object over time (when it was initially created, modified, deleted, etc.).

As another example, when performing a read operation (e.g., responsive to receipt of a list request), the instruction received from the storage service 322 may include key-related search terms that are used for querying the key data store 230. For example, the search term(s) may comprise an object identifier or portion thereof, and the key data storage controller 324 may query the ordered set of key entries in key data store 230 based on the it and return a corresponding result set. Additional or alternative search term(s) may include, but are not limited to, data describing a domain, bucket, timestamp, operation type, etc., and the key data storage controller 324 may query the ordered set of key entries in the key data store 230 based on them and return a corresponding result set.

In some cases, the result set may be ordered in inverse order beginning with the most-recent entry first and the oldest entry last, which mirrors the order in the ordered set of key entries of the key data store 230, although the result set could be ordered in other ways depending on implementation.

In some embodiments, further key components may be included in the instruction from the storage service 322 so the result set may be refined (e.g., limited to a certain client and/or operation type, etc.). In some cases, the most-recent entry for a particular object reflecting the most-recent data manipulation operation may be requested, in which case the result set may include a single result. Other variations are also possible and contemplated.

Advantageously, the key data storage controller 324 can manage recording concurrent data storage-related operations for the same object without having to lock the key data store 230.

The garbage collector 326 comprises computer logic executable to identify obsolete or redundant key entries. The garbage collector 326 may evaluate interwoven ordered key entries stored in the key data store 230 and garbage collect key entries based on their positioning in the key data store 230 relative other entries. For example, the garbage collector 326 may garbage collect a key entry for a particular object that is positioned in front of another key entry for that particular object having a certain operation type (e.g., delete, kill, etc.). Additional structure, acts, and functionality related to the garbage collector 326 is described below with reference to at least FIG. 7.

The storage service 322 comprises computer logic executable to process object storage requests. The storage service 322 may receive requests from local applications and/or remote applications. An application that sends storage requests to the storage application 224 is referred to herein as a client application. The storage service 322 can process the requests and transmit corresponding responses, which may include confirmation data confirming a successful execution of a storage-related operation, response data reflecting results of a query-based request, and/or error information reflecting any errors that were encountered, etc. In further embodiments, the functionality of the storage service 322 may be included in the key data storage controller 324, in which case the key data storage controller 324 may receive and process the object storage requests.

In some embodiments, the storage service 322 may include a request handler that receives and parses object storage requests from client applications, such as a client application operating on various client systems 202, server systems 220, etc. As discussed elsewhere herein, the request may include any data necessary for executing the request, such as data for generating a new key entry (e.g., key components, data value (e.g., an address, such as a link, pointer, reference, unique identifier, etc.)), data for querying entries based on the key (e.g., search terms, key components, etc.), object data to be stored in the object storage 240 (e.g., comprising a new object, modification to the object, object metadata describing the object, updates, etc.), etc. The storage service 322 may parse the data from the request and process it accordingly.

For example, responsive to receiving a request, the storage service may implement the requested object storage operations in the object storage 240. For example, the storage service 322 may read, write, update, and/or otherwise manipulate objects in the object storage 240 based on parameters of the request. For instance, if the request is a write request that stores a new object to the object storage 240, the storage service 322 may write the new object to the object storage 240.

The storage service 322 may interact with the key data storage controller 324 to store and retrieve data from the key data store 230. To do so, in some cases, the storage service 322 can issue various instructions to the key data storage controller 324, such as but not limited to instructions comprising put, get, delete, list, request, etc.

In some embodiments, in conjunction with the implementation of an object storage operation, the storage service 322 may request that the key data storage controller 324 store a new entry reflecting the operation responsive to receiving the object storage request from a client. As discussed elsewhere herein, each ticket/entry stored in the key data store 230 may be associated with an object storage operation performed at a particular point in time in association with an object in the object storage 240.

By way of further example and not limitation, the storage service 322 may request that the key data storage controller 324 store an entry in the key data store 230 that corresponds with an operation being performed on a corresponding object in the object storage 240. For instance, in association with writing a new object to the object storage 240, the storage service 322 may request that the key data storage controller 324 store a new entry comprising a corresponding object key (that includes the object identifier, inverse timestamp, etc.) and object reference in the key data store 230. Alternatively, when an object is deleted from the object storage 240, the storage service 322 can request that the key data storage controller 324 store an entry in the key data store 230 reflecting deletion of that object, as discussed elsewhere herein. In association with that instruction, the storage service 322 may or may not delete some or all instances of the object data from the object storage 240 depending on the data retention protocol.

In some embodiments, the storage service may instruct the key data storage controller 324 to query the key data store 230 for one or more entries matching query criteria included in the request. For instance, responsive to receiving the request, the key data storage controller 324 may query the operations associated with a particular object by querying the key data store 230 for the ordered keys associated with the object (e.g., using the object identifier, etc.), and return a result set to the storage service 322 for provision to the requester.

The storage service 322 may be coupled to the key data storage controller 324, and interact with the key data storage controller 324 to store and retrieve data from the key data store 230. The storage service 322 may be coupled to the key data storage controller 324, and interact with the key data storage controller 324 to store and retrieve data from the key data store 230.

In some embodiments, the storage service 322 may allocate space in the object storage 240 to store immutable objects. The storage service 322 may also determine and provide (e.g., to the key data storage controller 324) a link or pointer to the location of the object for use in an object key associated with the object. Similarly, if a particular object or version of an object is requested by a client system (e.g., client system 202 in FIG. 2), the storage service 322 may determine where the object is stored in the object storage 240, retrieve it, and transmit it.

Figure 4A:
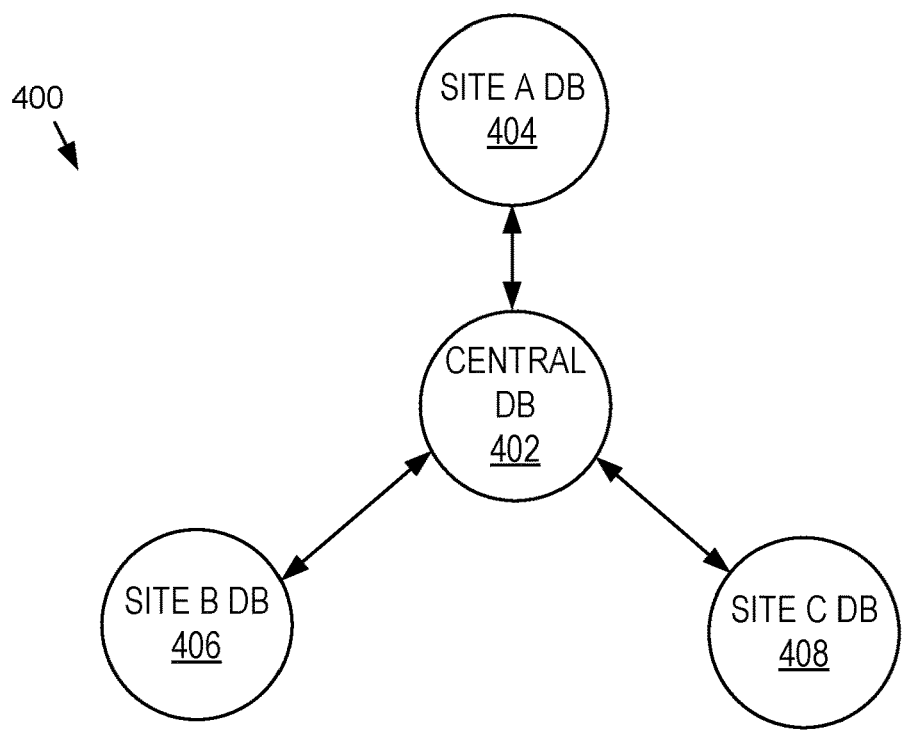
FIGS. 4A and 4B are diagrams of an example distributed database system with a central database.

FIG. 4A is a diagram of a distributed key data store system 400 that uses a central database and a plurality of branch databases (e.g., stored or hosted at remote locations). For example, the distributed key data store system 400 may be an asynchronous distributed system in which the contents of the key data store 230 may be asynchronously replicated between a central office and a plurality of branch offices (which may be located in geographically remote locations). Beneficially, the distributed key data store system 400 could use branch locations as database mirrors to provide additional protection against data loss from system failure, geographically locate infrastructure closer to a given group of users to decrease latency, etc. In such systems, the distributed database system controller 320 can efficiently replicate data between the distributed databases and resolve conflicts resulting from the asynchronous operation of the different databases in an efficient and consistent way.

In the example configuration depicted in FIG. 4A, a central database 402 may include an instance of the key data store 230. The branch databases (404-408) may also include an instance of the key data store 230. When a user sends a request to perform an object storage operation, the request may be received by the central database 402 or any of the branch databases 404-408. For example, if the site A database 404 receives an object storage operation request to update an object, the site A database 404 will insert an associated key entry into the key data store at site A and update the local copy of the object with any object data received with the storage request.

Once the site A database 404 has successfully performed the requested update, it may propagate the updated key data entry to the central database 402. In some example embodiments, this update may be performed as part of a scheduled data synchronization. In other embodiments, the update may be propagated asynchronously to the central database 402 in response to receiving the object storage operation request at the site A database 404.

In this example, once the central database 402 has received the key entry from the site A database 404 and successfully updated the key data store of the central database 402 (e.g., key data store 230 in FIG. 3), the central database 402 may then send updates to the branch databases that do not yet have the update (e.g., site B database 406 and site C database 408). The copies of the key data store (e.g., key data store 230 in FIG. 1) at the branch database locations may then be updated to include the most current key entries. Thus, the branch databases will eventually receive the update to help ensure concurrency. In this example, all the branch databases (404 to 408) connect to the central database 402.

Figure 4B:
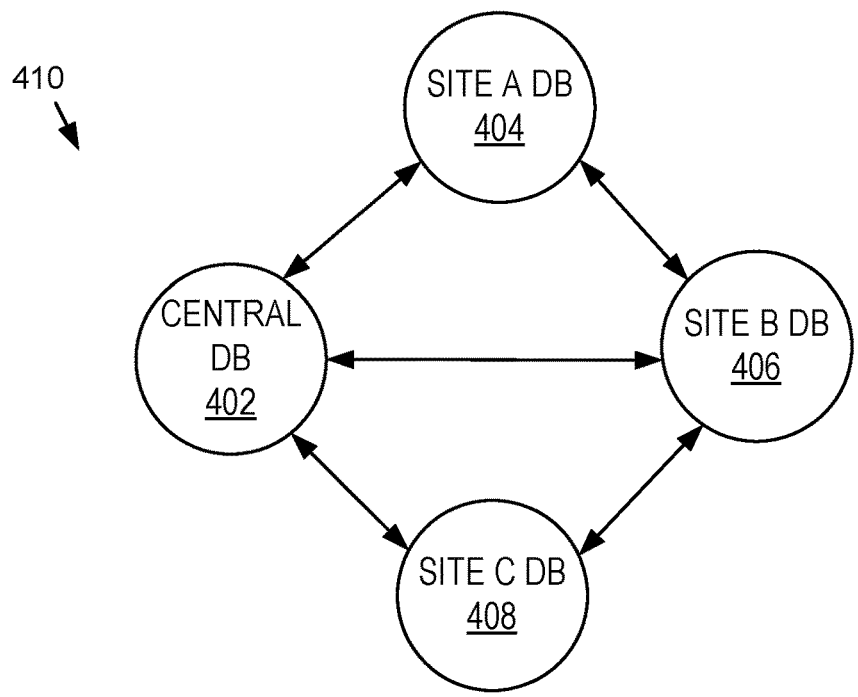

FIG. 4B is a diagram of a distributed key data store system 410 that uses a central database and a plurality of branch databases. In this example, the central database 402 is connected to the site A database 404, the site B database 406, and the site C database 408. In addition, at least some of the branch databases (404 to 408) are connected to other branch databases (e.g., see connection lines between 404 and 406).

In this example, if the site A database 404 receives an update, it can propagate the update to the central database 402 and at least one other branch site (e.g., the site B database 406). In this way, all the branch databases may be updated more quickly than the configuration as seen in FIG. 4A.

Figure 5:
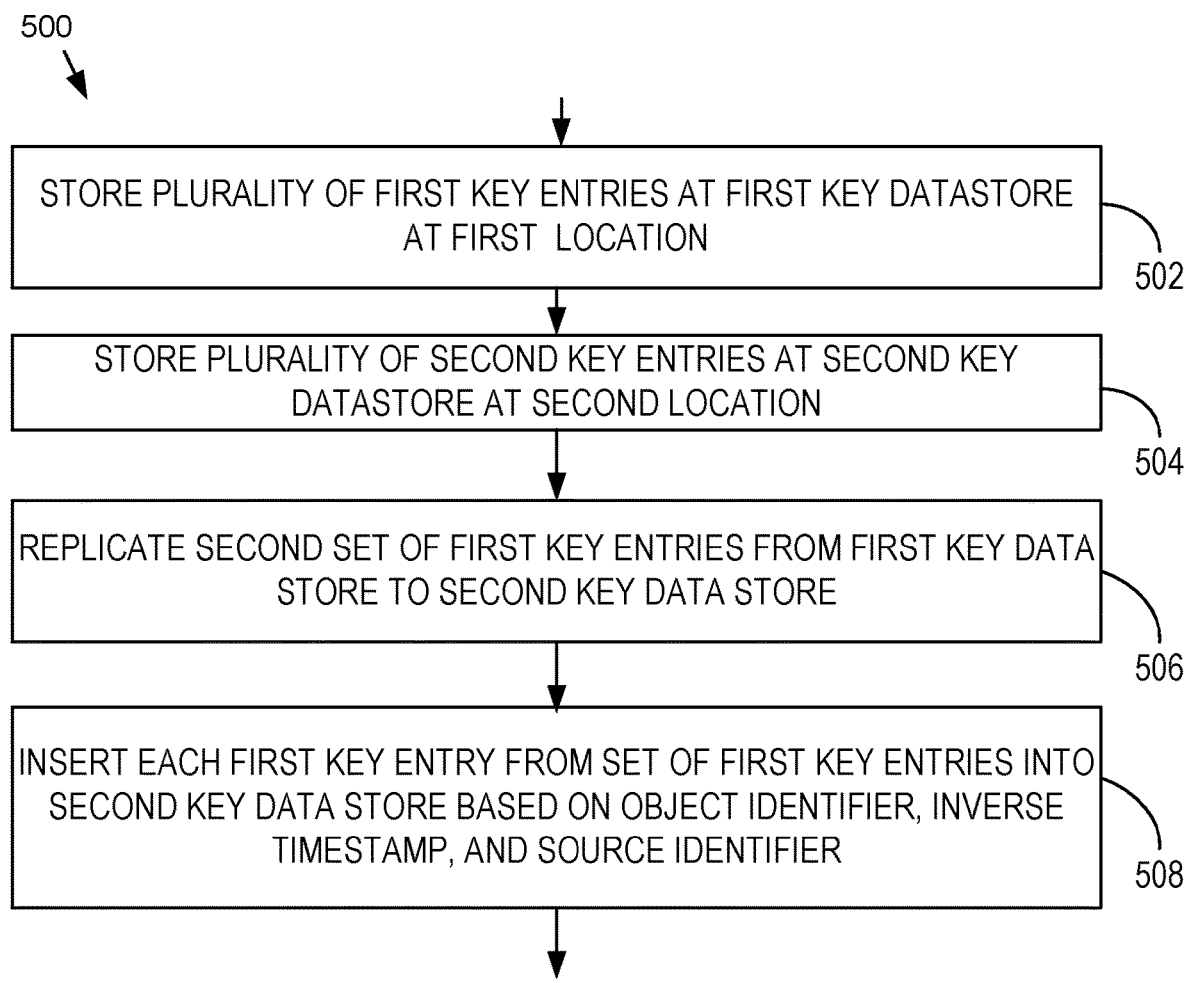
FIG. 5 is a diagram showing an example of interweaving a first set of key entries with a second set of key entries.
Figure 6:
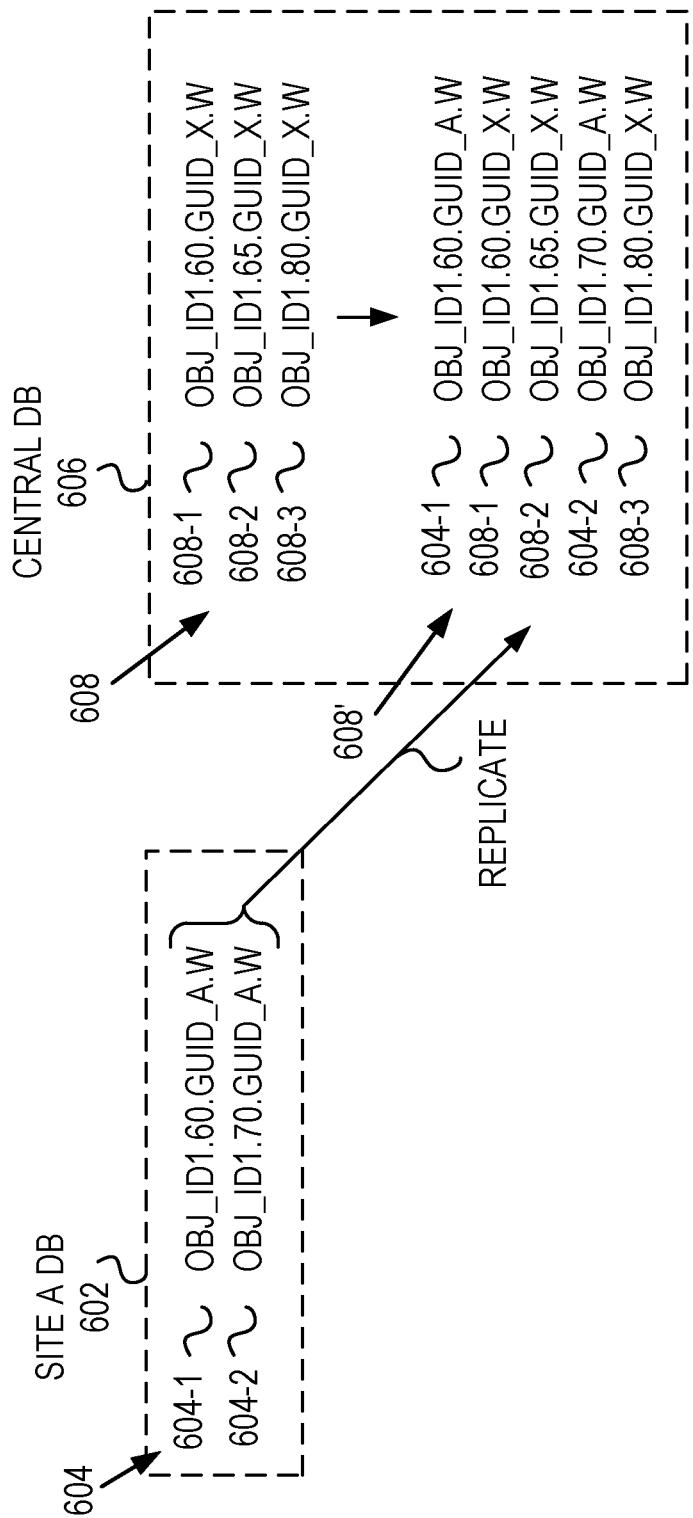
FIG. 6 is a flowchart of an example method for synchronizing two or more key data stores in a distributed database.
Figure 7:
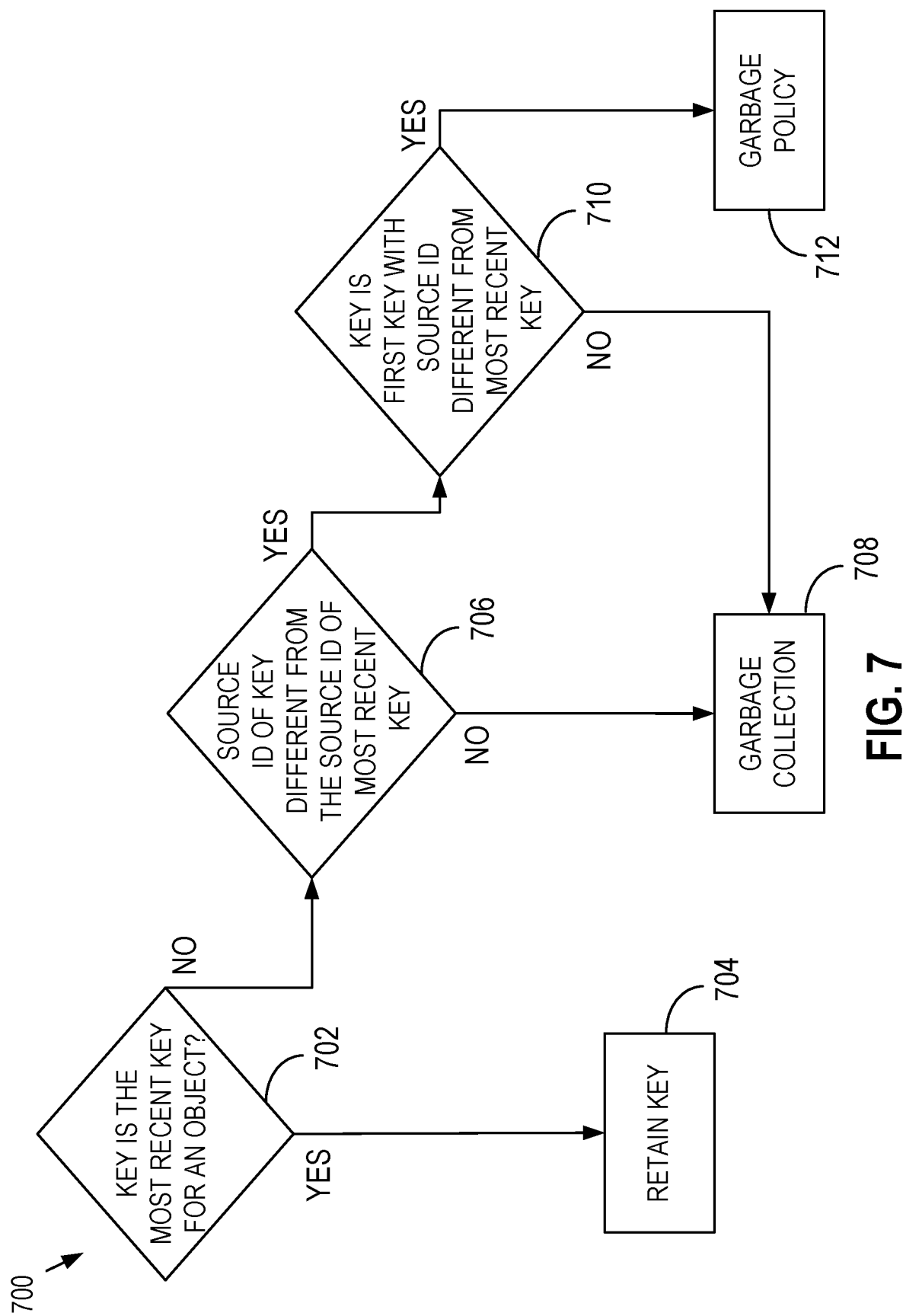
FIG. 7 depicts a flowchart of an example garbage collection method.

The methods of FIGS. 5-7 are now described. With reference to these methods, each of the operations shown and/or described may correspond to instructions stored in a computer memory or computer-readable storage medium, a customized logic chip, or other suitable implementation as discussed elsewhere herein.

FIG. 5 is a flowchart of an example method 500 for resolving conflicts in a system of distributed databases, and FIG. 6 depicts a non-limiting example scenario 600 related to the method 500 of FIG. 5.

In FIGS. 5 and 6, two example key data stores in different locations are referenced. Each key data store may contain key entries representing data storage operations associated with at least a portion of the objects stored at the distributed database. Because each key data store may be used to service different data operation requests, the entries between the key data stores may diverge and need to be synchronized. While in FIG. 5, key entries of two key data store instances 230 are described, it should be understood that entries can be replicated between, and conflicts resolved in, any number of key data stores 230 using the operations described herein.

In block 502 of the method 500, the distributed database system controller 320 may store a plurality of first key entries in a first key data store located at a first location. In some embodiments, each first key entry of the plurality of first key entries comprises a corresponding first key having an object identifier, an inverse timestamp, and a source identifier identifying a requester of an associated storage operation represented by that first key entry.

In block 504, the distributed database system controller 320 may store a plurality of second key entries in a second key data store located at a second location. In some embodiments, each second key entry of the plurality of second key entries comprises a corresponding second key having an object identifier, an inverse timestamp, and a source identifier identifying a requester of an associated storage operation represented by that second key entry. FIG. 6 depicts a non-limiting example of a first plurality of key entries 604 stored in a first key data store 602 (Site A DB), and a second plurality of key entries 608 are stored in a second key data (Central DB 606). In particular, the first plurality of key entries 604 includes two example key entries (604-1 and 604-2), and the second plurality of key entries 608 includes three example key entries (608-1 to 608-3).

In block 506, the distributed database system controller 320 may, in response to a synchronization request, send a set of the first key entries from the first key data store to the second key data store. Additionally or alternatively, a set of the second plurality of key entries may be sent from the second key data store to the first key data store. The set(s) of entries may include one or more of the entries from that key data store. In some cases, entries from the first and second data stores may be sent concurrently. In this way, both the first key data store location and the second key data store have entries synchronized between them.

In some embodiments, the distributed database system controller 320 may determine to synchronize entries between the first and second key data stores (e.g., one or more of the key entries 604 and/or one or more of the key entries 608). In some embodiments, this determination may be made based on asynchronous events. For instance, synchronization of the first and second key entries may be initiated asynchronously based on receipt of database storage requests, user instructions, database manager instructions, and so on. In further embodiments, synchronization may be determined based on a predetermined schedule or other suitable factors.

In block 508, in the embodiment where a set of first key entries are sent to the second key data store, the distributed database system controller 320 may insert each first key entry from the set of the first key entries into the second key data store based on the object identifier, the inverse timestamp, and the source identifier of the first key included in that first key entry. As a result, the set of the first key entries may be interwoven with the plurality of second key entries upon insertion to form a plurality of interwoven ordered key entries. As noted above, the object identifier, inverse timestamp, and a source identifier of the keys may be used to order the keys automatically based on the ordering scheme (e.g., an alphanumerical ordering scheme).

By way of further illustration, as shown in FIG. 6, the key entries 604 may be interwoven with the entries 608 of the second key data store. This results in a more current database of ordered key entries 608'. The interwoven key entries 608' are ordered/interwoven in the second key data store based on the dimension values included in their respective keys. For example, the key entries may be automatically ordered based on an alphanumeric sorting of the dimension values (also called key attributes or attributes), starting with the most left attribute in the string and proceeding attribute by attribute to the right (the object identifier, the timestamp, the source identifier, the operation type, etc.). If two key entries have the same object identifier, the keys entries are then ordered based on the next dimension, and so forth.

In the depicted example, the keys of the entries 604-1, 608-1, 608-2, 604-2, and 608-3, which comprise the updated entries 608' of the second key data store, have the same object identifier (OBJ_ID1). As such, ordering scheme of the key data store 230 further orders the entries based on the inverse timestamps of the respective entries (60, 60, 65, 70, and 80), and then the source identifiers of the respective entries (GUID_A, GUID_X, GUID_X, GUID_A, and GUID_X), and so forth. As a result, the entries with the lowest inverse timestamps qualify to be ordered first (key entries 604-1 and 608-1). However, since they have the same inverse timestamp, the ordering scheme determines (key entries 604-1 and 608-1 both have an inverse timestamp of 60), the two key entries are further ordered based on the next leftmost dimension value in the key, which in this case is the source identifier. In this example, the key of entry 604-1 includes source identifier "GUID_A" and the key of key entry 608-1 includes "GUID_X." As such, under the example alphanumeric ordering scheme, key entry 604-1 is sorted before key entry 608-1. It should be understood that other suitable ordering schemes and/or sorting criteria may be used and as long it is consistently used on all key data stores, in which case the synchronized key entry sets will automatically have the same order in each key data store.

Further, in the interwoven entries 608', the entries with the second and third lowest inverse timestamps are ordered third and fourth (key entries 608-2 and 604-2), and the key entry with the highest inverse timestamp is ordered to appear last (key entry 608-3).

FIG. 7 is a flow chart of an example garbage collection method 700 performed by the garbage collector 326. As discussed elsewhere herein, a distributed database system may include a plurality of key data stores at one or more database locations, and entries between those stores may be synchronized and interwoven. When key entry sets from different database locations are synchronized, a garbage collector system may access the interwoven ordered key entries in order to identify obsolete or redundant key entries.

In block 702 of the method 700, the garbage collector 326 accesses a key entry in a key data store 230 and determines whether the key entry is the first key entry associated with a particular object identifier in the object storage system. If it is, the garbage collector 326 in block 704 may retain the key entry, as it is the most up-to-date at that point in time.

For example, with reference to the interwoven entries 608' of FIG. 6, the garbage collector 326 may access and evaluate key entry 604-1, which is the first key entry associated with the particular object identifier (in this case, "OBJ_ID1"). As such, according to the operations in blocks 702 and 704, it would therefore be retained.

Referring again to FIG. 7, in block 702, responsive to determining that the current key entry is not the first key entry in the set of key entries associated with a particular object identifier in the key data store, the method 700 advances to block 706, in which the garbage collector 326 determines whether the source identifier is different from the source identifier of the first key entry. If it is not, the garbage collector 326 may garbage collect the key entry in block 708. If it is, the method 700 may advance to block 710, in which the garbage collector 326 may determine whether the current key entry is the first key entry associated with a source identifier that is different from the source identifier of the first key entry (e.g., the first key entry with the same object identifier as the current key entry). If it is not, the garbage collector 326 may garbage collect the current key entry in block 708.

If it is, the garbage collector 326 may update and/or use a different (e.g., more complex) garbage policy in block 712 to determine whether to garbage collect the key entry under evaluation. For example, the garbage collector 326 may update and/or use a policy that selects a particular action based the difference in inverse timestamp of the current key entry and the inverse timestamp of the first object key (e.g., the first key entry in the set of key entries with the same object identifier as the current key entry). If the time difference is larger than a predetermined threshold (e.g., one day, one week, or any period of time designated), the related action may include marking this key as garbage (e.g., designating it for removal). If the time difference is smaller than a predetermined threshold, the related action could include retaining this object key and/or issuing a warning message. This warning message may be issued the next time when a request for a read or write operation for the object associated with the current key is received from a client, for example.

By way of further illustration, in FIG. 6, in accessing and evaluating the key entries 608', the garbage collector 326 may determine under block 710 that key entry 604-2 has the same source identifier as key entry 604-1, and designates (e.g., flags) key entry 604-2 for garbage collection.

Further, in accessing and evaluating the key entries 608', the garbage collector 326 may determine, under block 710, that key entry 608-1 (which has a key with a source identifier GUID_X) is associated with a different source identifier than key entry 604-1 (which has a key with a source identifier GUID_A). As a result, the garbage collector 326 may use a differentiated garbage collection policy under block 712 to determine whether to retain or remove the key entry.

In contrast, when evaluating key entry 608-2, the garbage collector 326 determines under block 710 that key entry 608-2 (which has a source identifier that is the same as the source identifier of 604-1 (GUID_X)) is not the first key entry associated with a different source identifier than the first key in the interwoven entries 608'. As a result, key entry 608-2 may be garbage collected under block 708.

The operations described with reference to FIGS. 5 and 7 advantageously allow for consistent handling of synchronization of two or more set of key entries in a distributed database system. Further, requests can be handled in a parallel way by the storage application 224, without requiring interaction with the client, thereby allowing for high performance scalability, while helping to further guarantee consistency.

To ease understanding, some elements (e.g., requests, identifiers, timestamps, operations, etc.), may be referred to in the description and/or the claims using the labels first, second, third, etc. These labels are intended in some cases to help to distinguish the elements, but do not necessarily imply any particular order or ranking unless indicated otherwise.

Referring again to FIG. 3, in some embodiments, the key data storage controller 324 may determine that the number of object keys stored in the ordered set of key entries exceeds a predetermined threshold. The threshold may reflect the amount of storage space that can be acceptably utilized (e.g., a percentage of utilized storage space relative to a maximum) Responsive to such a determination, the key data storage controller 324 may add an additional shard, in which case the key data storage controller 324 may redistribute the object keys between the shards to help ensure that the object keys are more evenly spread between the database shards. In some cases, the key data storage controller 324 may update a range table to accurately represent which object keys are stored on which database shards. In further embodiments, the key data storage controller 324 may create new shards or re-shard the existing database shards for additional reasons including, but not limited to, improve performance of key data store 230, compliance to rules/laws/regulations, security policies, and/or load requirements of the key data store 230, and/or other suitable purposes.

The processor(s) 302 may execute software instructions by performing various input/output, logical, and/or mathematical operations. The processor(s) 302 may have various computing architectures to process data signals including, for example, a complex instruction set computer (CISC) architecture, a reduced instruction set computer (RISC) architecture, and/or an architecture implementing a combination of instruction sets. The processor(s) 302 may be physical and/or virtual, and may include a single processing unit and/or core or plurality of processing units and/or cores. In some implementations, the processor(s) 302 may be capable of generating and providing electronic display signals to a display device (not shown), supporting the display of images, capturing and transmitting images, performing complex tasks including various types of feature extraction and sampling, etc. In some embodiments, the processor(s) 302 may be coupled to the memor(ies) 304 via a communication bus 306 to access data and instructions therefrom and store data therein. The communication bus 306 may couple the processor(s) to the other components of the computing system 300, for example, memor(ies) 304, communication unit(s) 308, physical storage devices and/or storage systems (e.g., object storage 240, key data store 230).

The memor(ies) 304 may store and provide access to data to the other components of the computing system 300. The memor(ies) 304 may store instructions and/or data that may be executed by the processor(s) 302. For example, the memor(ies) 304 may store an instance of the storage application 224, software implementing the key data store 230, cached keys and objects, parameters, operating system(s), drivers, databases, and/or other software applications, etc. The memor(ies) 304 may be coupled to the communication bus 306 for communication with the processor(s) 302 and the other components of computing system 300.

The memor(ies) 304 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 302. In some embodiments, the memor(ies) 304 may include one or more of volatile memory and non-volatile memory (e.g., RAM, ROM, flash, solid state drive, hard drive, optical disc, tape, magnetic diskette, etc.). It should be understood that the memor(ies) 304 may include a single device or may include multiple types of devices and configurations.

The communication unit(s) 308 may include one or more interface devices for wired and wireless communication with the communication network 210 and the other entities and/or components of the distributed data storage system 200 including, for example, the client systems 202, server systems 220, object storage 240, etc. For instance, the communication unit 308 may include, but is not limited to, CAT-type interfaces; wireless transceivers for sending and receiving signals using Wi-Fi™; Bluetooth®, cellular communications, etc.; USB interfaces; various combinations thereof; etc. In some embodiments, the communication unit 308 can link the processor(s) 302 to the communication network 210, which may in turn be coupled to other processing systems. The communication unit 308 can provide other connections to the communication network 210 and to other entities of the computing system 300 using various communication protocols, including, for example, those discussed elsewhere, herein. In some instances, the communication unit 308 includes a wired port and a wireless transceiver. The communication unit 308 also provides other connections to the communication network 210 for distribution of files and/or media objects using various network protocols, such as those discussed elsewhere herein.

In some embodiments, the computing system 300 may include a software communication mechanism implemented via the communication network 210 and/or communication bus 306 that can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

In the above description, for purposes of explanation, numerous specific details are set forth to provide a thorough understanding of the various aspects of different example embodiments. Any particular example embodiment may in various cases be practiced without all of the specific details and/or with variations, permutations, and combinations of the various features and elements described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

It should also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It should also be understood that the term "and/or" as used herein refers to and encompasses any and/or all possible combinations of one or more of the associated listed items. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A computer-implemented method comprising:
    storing a plurality of first key entries in a first key data store located at a first location, each first key entry of the plurality of first key entries comprising:
        a corresponding first key having an object identifier, an inverse timestamp, and a source identifier identifying a requester of an associated storage operation represented by that first key entry; and
        a corresponding first data instance associated with the corresponding first key;
    storing a plurality of second key entries in a second key data store located at a second location, each second key entry of the plurality of second key entries comprising:
        a corresponding second key having an object identifier, an inverse timestamp, and a source identifier identifying a requester of an associated storage operation represented by that second key entry; and
        a corresponding second data instance associated with the corresponding second key;
    replicating a set of the first key entries from the first key data store to the second key data store; and
    inserting each first key entry from the set of the first key entries into the second key data store based on a key read operation of the first key included in that first key entry,
    wherein:
        each key read operation reads the first key of that first key entry to determine, without reference to the first data instance, a position in the second key data store;
        each first key entry is positioned, based on the object identifier of each first key, among second key entries with a same object identifier;
        each first key entry is positioned, based on the inverse timestamp of each first key, among second key entries with the same object identifier in inverse timestamp order; and
        the set of the first key entries are interwoven with the plurality of second key entries upon insertion to form a plurality of interwoven ordered key entries in the second key data store.

2. The computer-implemented method of claim 1, wherein inserting a particular first key entry from the set of the first key entries into the second key data store comprises:
    determining that the object identifier and the inverse timestamp of the corresponding first key included in the particular first key entry respectively match the object identifier and the inverse timestamp associated with the corresponding second key included in a particular second key entry in the plurality of second key entries; and
    determining a position of the particular first key entry with respect to the particular second key entry in the second key data store based on the source identifier of the corresponding first key included in the particular first key entry and the source identifier of the corresponding second key included in the particular second key entry.

3. The computer-implemented method of claim 2, wherein the position of the particular first key entry is one of:
    immediately after the particular second key entry in the second key data store; and
    immediately before the particular second key entry in the second key data store.

4. The computer-implemented method of claim 1, wherein replicating the set of the first key entries from the first key data store to the second key data store is executed responsive to receiving a request to synchronize the first key data store with the second key data store.

5. The computer-implemented method of claim 1, wherein:
    in each corresponding first key, the source identifier is appended as a suffix to the inverse timestamp; and
    in each corresponding second key, the source identifier is appended as a suffix to the inverse timestamp.

6. The computer-implemented method of claim 1, wherein inserting each first key entry from the set of the first key entries into the second key data store maintains a relative order of each second key entry of the plurality of second key entries relative to each other second key entry of the plurality of second key entries after insertion of the set of the first key entries into the second key data store.

7. The computer-implemented method of claim 1, wherein the plurality of interwoven ordered key entries is ordered alphanumerically using object identifiers, inverse timestamps, and source identifiers from corresponding keys of the plurality of interwoven ordered key entries.

8. The computer-implemented method of claim 1, further comprising:
    determining to garbage collect a particular interwoven key entry in the plurality of interwoven ordered key entries based on the object identifier, the inverse timestamp, and the source identifier of a corresponding key of the particular interwoven key entry.

9. The computer-implemented method of claim 1, further comprising:
    determining that a particular interwoven key entry in the plurality of interwoven ordered key entries is a most-recent key entry for a particular object identifier based on a corresponding key of the particular interwoven key entry; and
    retaining the particular interwoven key entry.

10. The computer-implemented method of claim 1, further comprising:
    determining that a particular interwoven key entry in the plurality of interwoven ordered key entries is not a most-recent key entry for a particular object identifier based on a corresponding key of the particular interwoven key entry;
    determining that a source identifier in the corresponding key of the particular interwoven key entry matches the source identifier of the corresponding key of a most-recent key entry associated with the particular object identifier in the plurality of interwoven ordered key entries; and garbage collecting the particular interwoven key entry.

11. The computer-implemented method of claim 1, further comprising:

determining that a particular interwoven key entry from the plurality of interwoven ordered key entries is not a most-recent key entry for a particular object identifier based on a corresponding key of the particular interwoven key entry;

determining that a source identifier in the corresponding key of the particular interwoven key entry does not match a source identifier of the corresponding key of a most-recent key entry associated with the particular object identifier in the plurality of interwoven ordered key entries;

determining that the particular interwoven key entry is the first key entry in the plurality of interwoven ordered key entries with the source identifier that does not match the source identifier of the corresponding key of the most-recent key entry associated with the particular object identifier; and selecting a resolution action based on a difference between a first inverse timestamp associated with the most-recent key entry and a second inverse timestamp associated with the particular interwoven key entry.

12. A distributed data storage system comprising:

one or more processors;

a first key data store at a first location comprising a plurality of first key entries, each first key entry of the plurality of first key entries comprising:

a corresponding first key having an object identifier, an inverse timestamp, and a source identifier identifying a requester of an associated storage operation represented by that first key entry; and a corresponding first data instance associated with the corresponding first key;

a second key data store at a second location comprising a plurality of second key entries, each second key entry of the plurality of second key entries comprising:

a corresponding second key having an object identifier, an inverse timestamp, and a source identifier identifying a requester of an associated storage operation represented by that second key entry; and a corresponding second data instance associated with the corresponding second key; and a synchronization application executable by the one or more processors to perform operations comprising:

replicating a set of the first key entries from the first key data store to the second key data store; and inserting each first key entry from the set of the first key entries into the second key data store based on a key read operation of the first key included in that first key entry, wherein:

each key read operation reads the first key of that first key entry to determine, without reference to the first data instance, a position in the second key data store;

each first key entry is positioned, based on the object identifier of each first key, among second key entries with a same object identifier;

each first key entry is positioned, based on the inverse timestamp of each first key, among second key entries with the same object identifier in inverse timestamp order; and the set of the first key entries are interwoven with the plurality of second key entries upon insertion to form a plurality of interwoven ordered key entries in the second key data store.

13. The distributed data storage system of claim 12, wherein the operation to insert a particular first key entry from the set of the first key entries into the second key data store comprises:

determining that the object identifier and the inverse timestamp of the corresponding first key included in the particular first key entry respectively match the object identifier and the inverse timestamp associated with the corresponding second key included in a particular second key entry in the plurality of second key entries; and determining a position of the particular first key entry with respect to the particular second key entry in the second key data store based on the source identifier of the corresponding first key included in the particular first key entry and the source identifier of the corresponding second key included in the particular second key entry.

14. The distributed data storage system of claim 13, wherein the position of the particular first key entry is one of:

immediately after the particular second key entry in the second key data store; and immediately before the particular second key entry in the second key data store.

15. The distributed data storage system of claim 12, wherein replicating the set of the first key entries from the first key data store to the second key data store is executed responsive to receiving a request to synchronize the first key data store with the second key data store.

16. The distributed data storage system of claim 12, wherein:

in each corresponding first key, the source identifier is appended as a suffix to the inverse timestamp; and in each corresponding second key, the source identifier is appended as a suffix to the inverse timestamp.

17. The distributed data storage system of claim 12, wherein inserting each first key entry from the set of the first key entries into the second key data store maintains a relative order of each second key entry of the plurality of second key entries relative to each other second key entry of the plurality of second key entries after insertion of the set of the first key entries into the second key data store.

18. The distributed data storage system of claim 12, wherein the plurality of interwoven ordered key entries is ordered alphanumerically using object identifiers, inverse timestamps, and source identifiers from corresponding keys of the plurality of interwoven ordered key entries.

19. The distributed data storage system of claim 12, wherein the operations further comprise:

determining to garbage collect a particular interwoven key entry in the plurality of interwoven ordered key entries based on the object identifier, the inverse timestamp, and the source identifier of the corresponding key of the particular interwoven key entry.

20. A system comprising:

at least one processor;

at least one memory;

means, stored in the at least one memory for execution by the at least one processor, for storing a plurality of first key entries in a first key data store located at a first location, each first key entry of the plurality of first key entries comprising:

a corresponding first key having an object identifier, an inverse timestamp, and a source identifier identifying a requester of an associated storage operation represented by that first key entry; and a corresponding first data instance associated with the corresponding first key;

means, stored in the at least one memory for execution by the at least one processor, for storing a plurality of second key entries in a second key data store located at a second location, each second key entry of the plurality of second key entries comprising:

a corresponding second key having an object identifier, an inverse timestamp, and a source identifier identifying a requester of an associated storage operation represented by that second key entry; and a corresponding second data instance associated with the corresponding second key;

means, stored in the at least one memory for execution by the at least one processor, for replicating a set of the first key entries from the first key data store to the second key data store; and means, stored in the at least one memory for execution by the at least one processor, for inserting each first key entry from the set of the first key entries into the second key data store based on a key read operation of the first key included in that first key entry, wherein:

each key read operation reads the first key of that first key entry to determine, without reference to the first data instance, a position in the second key data store;

each first key entry is positioned, based on the object identifier of each first key, among second key entries with a same object identifier;

each first key entry is positioned, based on the inverse timestamp of each first key, among second key entries with the same object identifier in inverse timestamp order; and the set of the first key entries are interwoven with the plurality of second key entries upon insertion to form a plurality of interwoven ordered key entries in the second key data store.

\* \* \* \* \*